Jan. 13, 1970 H. S. VAN BUREN, JR Re. 26,769

FASTENER FOR SECURING PLASTIC MEMBERS TO A SHAFT

Original Filed May 25, 1965

Inventor:
Harold S. van Buren Jr.,
by Philip E. Parker
Atty.

United States Patent Office

Re. 26,769
Reissued Jan. 13, 1970

26,769

FASTENER FOR SECURING PLASTIC MEMBERS TO A SHAFT

Harold S. van Buren, Jr., Lexington, Mass., assignor to United-Carr Incorporated, Boston, Mass., a corporation of Delaware Original No. 3,338,604, dated Aug. 29, 1967, Ser. No. 458,686, May 25, 1965. Application for reissue Apr. 15, 1968, Ser. No. 724,320
Int. Cl. F16d *1/06;* B60b *27/06*
U.S. Cl. 287—53 4 Claims

Matter enclosed in heavy brackets [ ] appears in the original patent but forms no part of this reissue specification; matter printed in italics indicates the additions made by reissue.

ABSTRACT OF THE DISCLOSURE

[A sheet metal fastener for coupling a molded plastic part, for example, a control knob having an internal bore, to the end of a notched shaft. The fastener includes an elongated shaft housing which is press fitted in the bore and an integral leaf spring adjacent the end of the housing which receives the shaft. The spring includes a loop defining an opening which is axially offset from the open end of the housing. Thus, when the shaft is passed through the loop opening and into the housing, the spring is automatically depressed to permit full insertion of the shaft end into the housing and one side of the loop snaps into the notch in the shaft when the latter is fully seated to positively lock the parts in assembly.]

*The combination of a molded plastic member, for example, a control knob having an internal bore and a fastener for connecting the member to a shaft. The fastener includes a shaft housing which is press fitted into the bore in the knob. The shaft housing has a plurality of apertures formed therein and portions of the knob adjacent the bore are disposed in the said apertures to securely retain the shaft housing in the bore. A leaf spring which is integral with the shaft housing has a loop portion and a flange which cooperate to define a shaft receiving opening. The said combination is adapted to be connected to a shaft by passing the shaft through the said shaft receiving opening and into the shaft housing and to be releasably retained therein by the bias of the leaf spring against the shaft.*

This invention concerns a new and useful spring metal fastener which is particularly adapted for connecting a molded plastic member such as a plastic control knob to a shaft.

The principal object of the invention is to provide a fastener which produces a firm connection between the plastic member and the shaft and is capable of withstanding the application of considerable torque and pull (i.e., tension) to the plastic member without becoming dislodged therefrom.

A further object of the invention is to provide a fastener which fully envelops that portion of the shaft seated in the plastic member.

An additional object is to provide a fastener which is adapted to take advantage of the inherent elastic memory of a plastic material for firm retention of the fastener in a plastic member.

A still further object of the invention is to provide a fastener which contributes to the simplification of molding techniques employed to produce plastic members designed to accommodate the fastener.

Other objects and advantages of the novel fastener will become evident from a reading of the following detailed description in conjunction with a viewing of the accompanying drawings in which.

Figure 1:
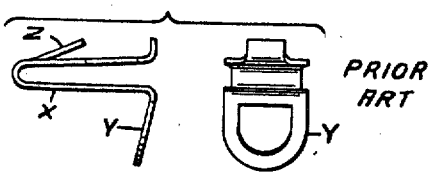
FIG. 1 is an example of the prior art in fasteners employed in connecting a molded plastic member to a shaft.
Figure 2:
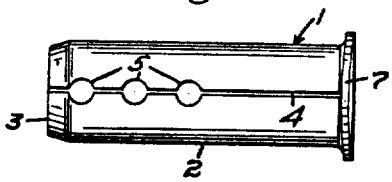
FIG. 2 is a top plan view of the present invention.
Figure 3:
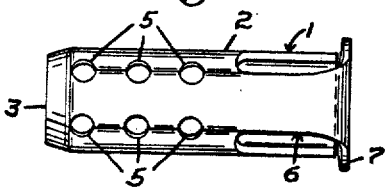
FIG. 3 is a bottom plan view of the present invention.
Figure 4:
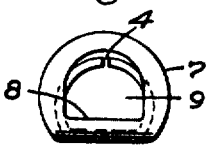
FIG. 4 is an end view of the invention as seen from the right side of FIG. 2.

The fastener 1 includes a shaft housing 2 which for purposes of illustration is shown in FIGS. 2 through 6 to be the shape of the letter D to conform to the shape of the portion of the shaft to be engaged. The shaft housing 2 is tapered at one end 3 to facilitate its insertion into a plastic member. Since the housing is formed by curling a blank of sheet metal into the D shape, a narrow gap 4 separates the upper curved portions thereof. The housing 2 also has a plurality of openings 5, the purpose of which will be more fully described hereinafter.

A leaf spring 6 formed as an integral part of the housing 2 is located at the entrance to the housing opposite the tapered end 3. The spring 6 includes a loop portion 7 and a flange 8 which co-operate to define an opening 9 which is slightly larger than a cross-section of the shaft which is to be engaged. The flange 8 extends upwardly to provide a partial barrier at the entrance to the shaft housing 2.

Figure 5:
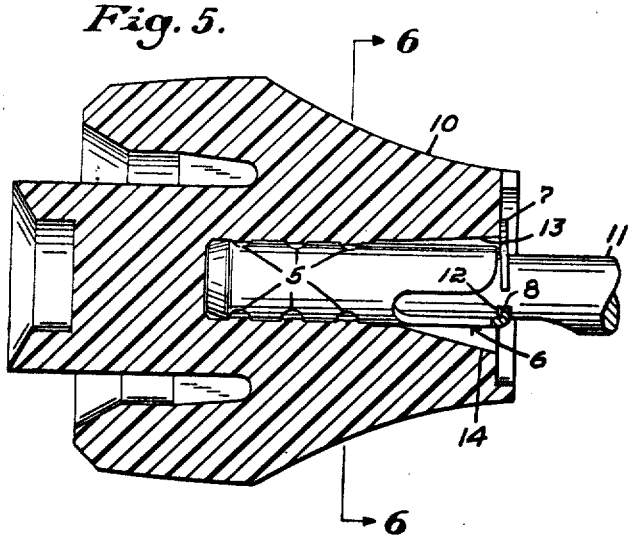
FIG. 5 is a view of an installation depicting the fastener of FIG. 2 securing a molded plastic control knob to a section of a shaft with the knob being shown in section and the leaf spring portion of the fastener partially broken away.
Figure 6:
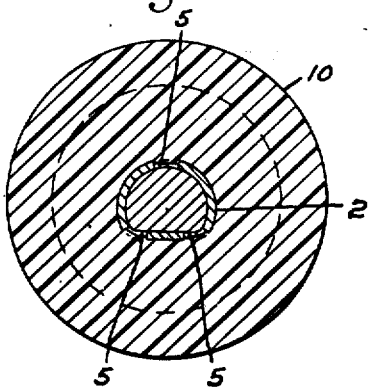
FIG. 6 is a section taken on line 6—6 of FIG. 5.

FIGS. 5 and 6 depict an installation wherein the fastener 1 is utilized to connect a molded plastic control knob 10 to a D-shaped section of shaft 11 having a notch 12 cut therein.

The knob 10 has an internal bore 13 which is widest adjacent its open end and gradually tapers inwardly to about the midpoint of its length after which it continues at a constant width to its inner closed end. A cutout 14 is formed adjacent the open end of the bore 13 to allow for downward flexing of the leaf spring 6 as will shortly be explained in detail.

The assembly is carried out by initially forcing the shaft housing 2 into the bore 13. The width of the inner portion of the bore is smaller than the width of the major portion of the shaft housing 2. The tapered end 3 of the housing provides a lead-in to the narrow portion of the bore and the closing of the gap 4 to a slight degree relieves the interference. However, even with the gap 4 closed the width of the shaft housing 2 is greater than the width of the inner end of the bore 13. Thus, the housing must be forced into the bore causing an outward compression of the plastic material of the knob 10. This portion of the assembly is best described as a press-fit between the shaft housing and the knob.

The assembly is completely by inserting the end of the shaft 11 into the opening 9 in the fastener, applying upward pressure on the knob to depress the leaf spring 6 downwardly towards the cutout 14 and sliding the shaft into the shaft housing 2. When the shaft is inserted to the point where the notch 12 registers with the flange 8 the spring returns to the position of FIG. 5 and securely locks the knob to the shaft. If desired the knob may later be removed from the shaft by applying a force to the upper end of the loop portion 7 to depress the leaf spring and while holding the latter down removing the knob and fastener from the shaft.

Those having familiarity with plastic materials will appreciate that the compression or squeezing of a plastic in one direction will cause a certain amount of cold flow of the material in other directions, and that upon release of the pressure there will be a tendency to return to the original shape or attitude due to the inherent elastic memory of the plastic. The apertures 5 in the housing 2 are designed to take advantage of the aforementioned characterics of the plastic material by providing as it were a path of least resistance for portions of the plastic to follow as the knob is compressed by the jamming of the shaft housing 2 into the narrow end of the bore 13. Thus FIGS. 5 and 6 depict portions of the plastic material flowing a slight distance into the apertures 5. Tests conducted to date indicate that a fastener provided with the openings 5 has substantially greater tensile holding power than an imperforate fastener.

Consideration of the fastener shown in FIG. 1 serves to distinctly point out the improvement in the art contributed by the present invention. That fastener is inserted in a bore in a plastic member in much the same manner as the present invention, and the portions X and Y function essentially the same as the leaf spring of the present invention in engaging a notched shaft. However, the spring in the former fastener is the only portion which engages the shaft as compared with the envelopment of the shaft by the shaft housing 2 of the present invention. Further, the prior fastener is retained in a plastic member by the engagement of the spring finger Z against a rearwardly facing shoulder provided by an undercut in the bore. Since in molding the plastic member the mold pin which provides the shoulder can only be removed from the end of the member opposite the main entrance to the bore, the end result is that an opening extends entirely through the plastic member. Thus to rectify what is considered an unattractive condition it is necessary to cap one end of the plastic member. This latter operation has been entirely eliminated in the production of plastic members adapted to accommodate the present invention. The most important improvement represented by the present invention, however, is illustrated by tests recently conducted which indicate that the new fastener will withstand a torque of up to 55 inch lbs. applied to the plastic member before the fastener will begin to rotate in the shaft, and 160 lbs. pull on the knob before it becomes dislodged, as compared with 20 inch lbs. torque and 80 lbs. pull respectively resulting from the same type of tests conducted with the fastener shown in FIG. 1.

In addition it has been found to be practically impossible to manually remove a knob secured by the present invention from a shaft even by simultaneously twisting and pulling on the knob, since the D-shape shaft housing firmly resists rotation of the knob on the shaft.

Conversely in the former fastener, which is devoid of any element equivalent to the present shaft housing, a knob can be readily removed by imparting a rapid twisting and pulling thereto.

Figure 7:
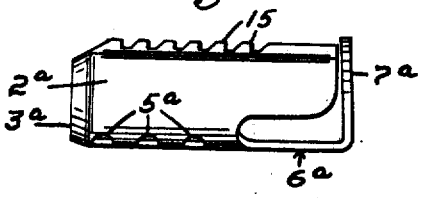
FIG. 7 is a side elevation of a modified form of the invention.
Figure 8:
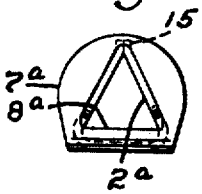
FIG. 8 is an end view of the modified fastener as seen from the right of FIG. 7.

The modified version of the invention shown in FIGS. 7 and 8 has a triangular shaped shaft housing 2a which is designed to accommodate a portion of a shaft having a corresponding shape.

In addition, the modified form of the invention is notched to provide a series of teeth 15 which bite into the plastic material of a knob, etc., adjacent the bore in which the fastener is seated. The leaf spring 6a functions in exactly the same manner as leaf spring 6 in the previously described form of the invention.

With reference to the foregoing description it is to be understood that what has been disclosed therein represents only two embodiments of the invention and it is anticipated that other changes and modifications of the basic disclosure might be made without departing from the scope of the invention which is best defined by the following claims.

I claim:

1. An installation comprising in combination a molded plastic member having a bore therein connected to a [notched] shaft by a fastener, said fastener including a shaft housing seated in the bore in said plastic member in tight frictional engagement with the internal portions of said member defining said bore, said shaft housing being provided with a plurality of apertures and portions of said plastic member adjacent said bore being disposed in said apertures to securely retain said shaft housing in said bore, a portion of said shaft being seated in said shaft housing, and a leaf spring integral with said shaft housing, said spring including a loop portion and a flange cooperating to define an opening through which said shaft extends such that said flange is spring biased [into the notch in] *against* said shaft to securely lock said plastic member to said shaft.

2. An installation according to claim 1 wherein said shaft housing has at least two teeth in line along the axis in biting engagement with the internal portions of said plastic member defining said bore.

*3. An installation according to claim 1 wherein said shaft is notched and said flange on said spring is biased into said notch.*

*4. The combination of a molded plastic member having an internal bore and a fastener for connecting the member to a shaft, said fastener including a shaft housing seated in the bore in said plastic member in tight frictional engagement with the internal portions of said member defining said bore, said shaft housing being provided with a plurality of apertures and portions of said plastic member adjacent said bore being disposed in said apertures to securely retain said shaft housing in said bore, and a leaf spring integral with said shaft housing, said spring including a loop portion and a flange cooperating to define a shaft receiving opening, the said combination being adapted to be connected to a shaft by passing the shaft through the said shaft receiving opening and into said shaft housing and to be securely, releasably retained thereon by the bias of said spring against the shaft.*

References Cited

UNITED STATES PATENTS

The following references, cited by the Examiner, are of record in the patented file of this patent or the original patent.

| | | | |
|---|---|---|---|
| 2,128,370 | 8/1938 | Murphy | 287—53 |
| 2,476,762 | 7/1949 | Petre et al. | 279—96 |
| 2,643,903 | 6/1953 | Nathan | 287—53 |
| 2,745,689 | 5/1956 | Balint et al. | 287—53 |
| 2,938,405 | 5/1960 | West | 287—53 X |
| 2,978,263 | 4/1961 | Walsh et al. | 285—256 |

REINALDO P. MACHADO, Primary Examiner

A. V. KUNDRAT, Assistant Examiner

U.S. Cl. X.R.

74—553; 292—353